March 17, 1953     R. H. ANDERSON     2,631,709
LIMIT STOP MECHANISM
Filed May 2, 1949     2 SHEETS—SHEET 2
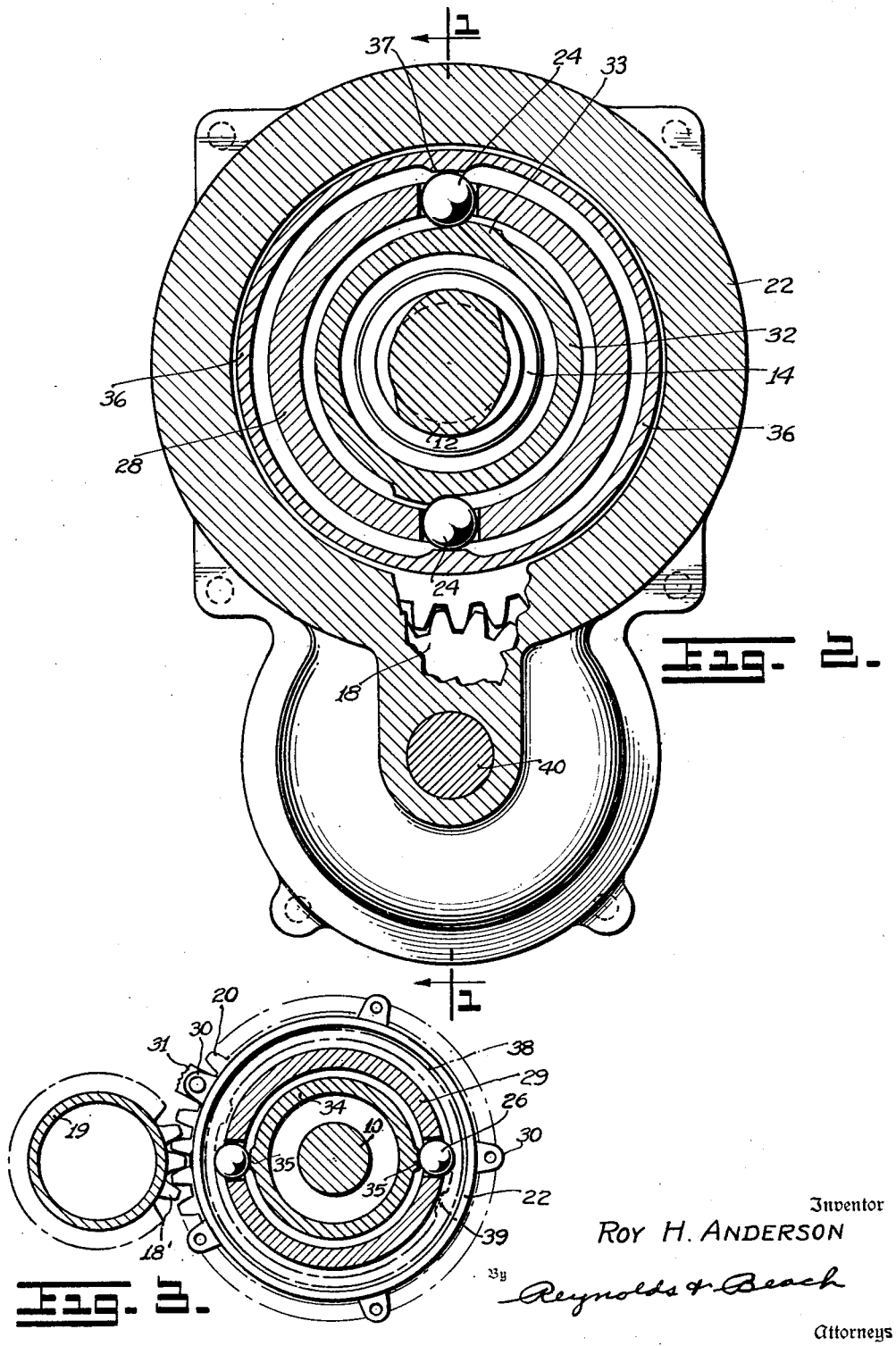
Inventor
Roy H. Anderson
By Reynolds & Beach
Attorneys Patented Mar. 17, 1953

2,631,709

UNITED STATES PATENT OFFICE 2,631,709

LIMIT STOP MECHANISM

Roy H. Anderson, Bellevue, Wash., assignor to Boeing Airplane Company, Seattle, Wash., a corporation of Delaware Application May 2, 1949, Serial No. 90,963

8 Claims. (Cl. 192—141)

This invention relates to movement-limiting devices, and more particularly to stop mechanisms for shafts, operable to define opposite limit positions therefor separated by a predetermined, usually large, number of shaft rotations. The preferred and herein illustrated form of the invention was devised particularly to stop positively rotation of a drive shaft in the event of a limit switch failing to deenergize power means driving such shaft, for use in airplanes to limit travel in either direction of the wing flaps driven by such shaft. However, it will be evident that the principles of the invention can also be employed advantageously in many other types of installations requiring stop mechanisms.

The present invention was prompted by an urgent need for a sufficiently compact and lightweight stop mechanism capable of permitting a rather large number of complete shaft rotations between its limit positions. Clearly there are common mechanical expedients, such as speed reducer gear trains or the like, which might have been adopted to actuate stop mechanism after the desired large number of rotations of the main drive shaft driving such a reducer, for example, but these were rejected because of their extravagant space requirements and weight. Also they would be more expensive than the device herein described, especially if the required number of shaft rotations between limits is large. Still other problems entailed would be mechanical inertia, friction and the physical difficulty of providing moving parts and mechanical stops strong enough to resist rotation of the slowest gear in a speed reducer train at the large mechanical advantage at which it operates.

The difficulties just mentioned are satisfactorily overcome by the present invention employing a helical screw rotated by the shaft, a traversing nut cooperating with such screw, means to rotate the nut in the same direction as the screw but at a slightly different speed, and separate stop means at the opposite ends of the nut's travel, engageable by the nut to stop rotation of the shaft.

As a more specific feature of the invention the periphery of the traveling nut is formed as a gear continuously engageable with a second gear which in turn is driven by the shaft to be stopped, such as through a third gear rotated by such shaft, the respective gear ratios being such as to produce only a slight difference in the rotative speeds of the nut and screw. This differential speed between the nut and screw effects but slow progress of the nut along the screw so as to prolong the nut's travel between its limiting positions. The shaft to be controlled may carry the screw and the third mentioned gear directly, as herein shown and described, or in a less preferred, incidental or alternative mode of operation of the mechanism the controlled shaft may drive the second gear to rotate the nut and, through the third gear, the screw.

A specific feature of the invention resides in the particular nut-engageable stop means used, one being located, as to certain of its elements, at each end of the nut's travel to stop rotation of the screw and thereby the shaft when such nut and stop engagement occurs. Preferably each such stop means accomplishes that end operatively by directly restraining the screw's rotation, or, in an alternative mode of operation, directly the nut's rotation. For such purpose the stop means preferably includes one or more balls received in a fixed retainer collar and guided for displacement in such collar radially of the screw and nut axis, but not circumferentially, such collar encircling the screw, and further comprising abutment means carried by the screw for rotation into cyclic engagement with the balls and normally movable past them to deflect them momentarily in passing, and cooperating abutment means carried by the nut. Such cooperating abutment means, likewise rotatable about the screw, moves into cyclic deflecting engagement with the balls only during a final increment of the nut's travel in either direction toward the desired end-point and upon arrival at such point deflects the balls unyieldingly into the rotation path of the screw abutment means, whereby such screw is stopped positively.

In general terms, when the rotating nut member approaches a desired limiting position of its travel along the differentially rotating screw member an abutment on one of said members deflects a retained ball radially directly into the rotary path of an oncoming abutment on the other member, which latter abutment then lodges against the ball by further circumferential movement to restrain such other member against further rotation. By thus holding the member carrying such latter abutment against continued rotation in the same direction, the other member also is held against further rotation indirectly through the gear train or equivalent mechanism rotatively interconnecting such members. This stops the shaft, irrespective of whether it is directly connected to the screw or rotatively to any of the interconnected rotative elements in the mechanism.

Other and more specific features, objects and advantages of the invention will become further evident from the following description of the preferred form of device illustrated in the accompanying drawings.

Figure 2 is a transverse section thereof taken on line 2—2 of Figure 1; and Figure 3 is a transverse section of a portion of the device, taken on line 3—3 of Figure 1.

Figure 1:
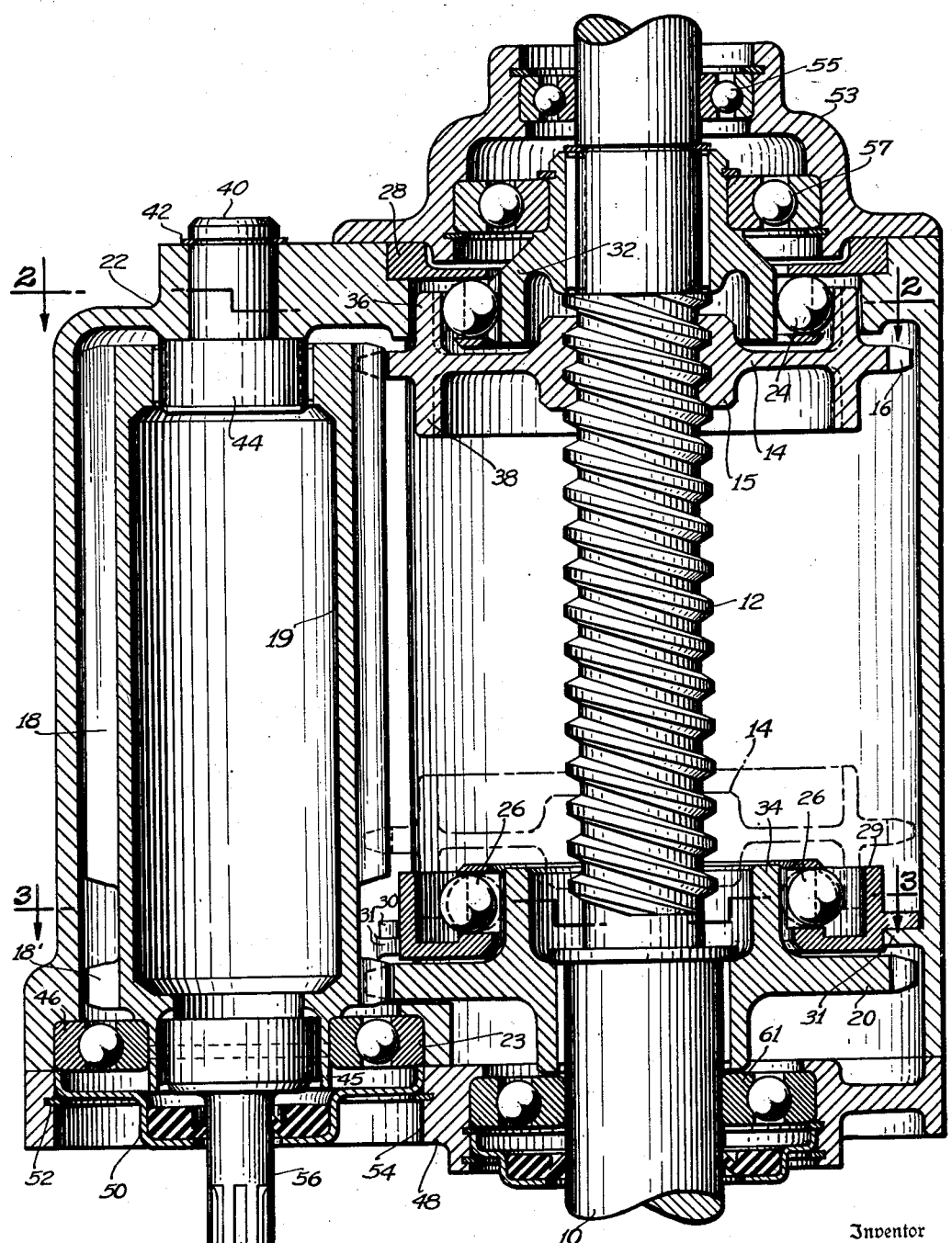
Figure 1 is a central longitudinal section of the stop mechanism, taken on line 1—1 of Figure 2.

In the drawings, the rotationally limited shaft 10 is shown in vertical position, although it may be set horizontally or at any desired angle without affecting the essential form or operation of the stop mechanism.

A main element of the stop mechanism includes a helical screw 12 rotated by or with the shaft 10. In the illustrated case the screw is actually formed integrally with the shaft, extending over a selected portion of its length. A nut 14 is threaded on the screw for travel lengthwise of it and preferably carries an annular gear 16 formed on its periphery. This gear meshes continuously with a second gear, in this case an elongated idler gear 18 having teeth formed on a cylindrical body 19 rotative about an axis parallel to the screw 12. The lower end of gear body 19 carries a gear section 18' meshing with a third gear 20 secured to the shaft 10, such as by splines or a key, to rotate with it. A suitable housing 22 encases these and other elements of the stop mechanism.

The housing, which in this case constitutes a support for certain elements of the stop mechanism, is suitably held against rotation about the axis of shaft 10. The drawings do not show any particular anchor means for thus fixing the housing against rotation, since such means will vary with the type of installation.

Other main elements of the stop mechanism include an upper set of balls 24 and a lower set of balls 26, in this case two diametrically opposed balls to a set, balancing the load on the housing and shaft, especially when stopping occurs. However, the device would be operative if only a single ball or more than two balls were to be used, as will become evident. Balls 24 and 26 are received in upper and lower retainer rings 28 and 29, respectively. These retainer rings are fixedly secured to the housing 22, the upper ring 28 to the upper end wall of the housing and the lower ring 29 secured by ears 30 on it to suitable internal lugs 31 on the housing. In this fashion the ball retainer rings are secured so that they cannot rotate about shaft 10 which they encircle.

An upper abutment collar 32, secured, as by splines or a key, to shaft 10, is received concentrically within the retainer ring 28. Similarly, a lower abutment collar 34, formed as a circular flange projecting axially from the upper side of gear 20, is received concentrically within retainer ring 29. These collars have annular recesses therein each of which opens toward the other collar to accommodate the respectively adjacent ends of the hub 15 of nut 14 when it is moved into its respective end positions of travel along screw 12.

The nut 14 has oppositely extending upper and lower annular abutment flanges 36 and 38 concentric therewith, and in the nut's extreme upper and lower positions one or the other of these flanges encircles the adjacent ball retainer ring 28 or 29.

It is important to note that the nut 14 and the screw 12 should be rotated differentially so that the nut will actually travel along the screw. Thus, if, in Figure 1, rotation of screw 12 is counterclockwise as viewed from its lower end and nut 14 is rotated in the same direction, but at a lesser rate, the nut will be caused to descend on the screw. Alternatively the screw may be rotated clockwise as viewed from its lower end and nut 14 rotated in the same direction but slightly faster than the screw, also to move the unit downward along the screw, which would be the case in the alternative or less preferred mode of operation.

Differential rotation of screw 12 and nut 14 during rotation of drive shaft 10 may be accomplished in various possible ways. In the illustrative case it is accomplished by gears, selecting different gear ratios between nut gear 16 and idler gear 18, and between shaft driven gear 20 and the idler gear, respectively. By a choice of gear ratios differentiated only slightly, the nut 14 is caused to travel very slowly along screw 12, even at high rotational speeds of the screw, and it will take a large number of screw rotations before the nut moves from the extreme position at one end of the screw to the other end of the screw to stop rotation of shaft 10. The number of rotations between stop limits will also depend, of course, upon the length of screw 12 measured in number of pitch distances between limit positions of the nut.

If, for example, the number of teeth on idler gear 18, engaging nut gear 16, is the same as on gear section 18', engaging gear 20, and gear 20 has 27 teeth while gear 16 (of nut 14) has 28 teeth, then 28 revolutions of shaft 10 will be required to shift nut 14 one pitch distance along screw 12 in one direction. If gear 20 has 29 teeth it will still be moved one pitch distance along screw 12 by 28 revolutions of shaft 10, but in the opposite direction. If the nut must travel 6 pitch distances on the screw between its end positions of travel, it is obvious that shaft 10 is enabled to rotate 6 times 28, or 168, revolutions between its limit positions.

The values in the case just given are merely exemplary, and the number of shaft rotations permitted may, of course, be readily increased or decreased by appropriate selection of different differential ratios of the gears, or by increasing or decreasing the length of the screw in terms of pitch distances. If, for example, in the illustrated case, gear 16 of nut 14 had 56 instead of 28 teeth and the gear 20 had 55 instead of 27 teeth, the number of rotations of shaft 10 between its limits would be increased from 168 to double that amount, or 336.

By the stop means of the mechanism shown, a precision limiting effect on shaft 10 can be obtained by directly stopping further rotation of the screw in relation to the housing, yet the stop elements engaged will be contacted positively or squarely to enable carrying heavy loads. This is accomplished in the preferred form by use of the fixed ball retainer rings 28 and 29 interconnectable with a shaft collar 32 or 34 and nut 14 at its respective upper and lower limits of travel, through balls 24 or 26, respectively, engaging abutments on such collar and on the flanges of the nut.

As shown in Figure 2, the retainer ring 28, which in this respect is like the retainer ring 29, has diametrically opposed radial bores in which the balls 24 are guided for radial shifting between the adjacent inner periphery of the flange 36 on nut 14 and the outer periphery of collar 32 secured to shaft 10. The latter has diametrically opposed axially extending abutments or ribs 33 on its periphery which are movable past the balls 24, as shaft 10 rotates, when such balls are in their outer positions or are free to be shifted outwardly in their sleeve bores by engagement of the ribs with such balls. Near the upper end of the nut's travel along screw 12, similar ribs or abutments 37 on nut flange 36 may pass the balls 24 during rotation of the nut effected by gear 16, the balls being shifted into their inner positions by engagement of the ribs 37 with them to allow movement of the ribs past them. Such shifting of the balls by the abutments 37 occurs, in the illustrated case, several times before the limit position of travel of the nut is finally reached, but until the latter instant the balls are shifted alternately by abutments 37 and 33 at different times and so produce no interference between the abutments by a ball at such times.

It will be evident that even when the nut flange 36 has moved into encirclement of ball retainer 32, as long as the collar ribs 33 and nut flange ribs 37 are considerably spaced circumferentially, they will pass the balls 24 in alternate sequence, shifting the balls first outward and then inward during such rotation. Both a rib 33 and a rib 37 in substantially radial registry cannot pass a ball, however. The nut flange ribs and screw collar ribs are so rotationally related to the circumferential locations of the balls that, as the nut is just moving into its desired end position of travel along screw 12, the abutments 37 are then approaching the balls 24 and are about to be overtaken by the abutments 33 as a result of the differential rotation of the screw and nut.

Upon further rotation of the screw and nut the ribs 37 move into registry with the balls, and in so doing displace them radially inward in their respective guide bores. At this instant, and before the ribs 37 can move out of ball-displacing position, the sides of the overtaking ribs 33 circumferentially approach and engage the inwardly shifted balls. Such abutment of collar ribs 33 with balls 34 instantaneously stops rotation of the screw and thereby of the shaft 10 in positive manner. This is true since the inwardly displaced balls cannot then yield outwardly to allow passage of abutments 33, being held inward by abutments 37, as shown in Figure 2, and also since the balls cannot yield circumferentially because ring 28 is anchored to the housing and the latter is suitably secured against rotation, as previously mentioned. All further rotation of shaft 10 in the same direction is thereby arrested at a precisely determined shaft limit position. Being rotatively connected to shaft 10 through gear 20, gear section 18', gear 18 and nut gear 16, nut 14 is also stopped.

When shaft 10 is reversed nut flange ribs 37 and collar ribs 33 move conjointly away from the balls 34 in the opposite direction. Nut 14 then duly traverses screw 12 to its other (lower) limiting position as indicated by broken lines (Figures 1 and 3). An arrangement of balls 26, similar to that of balls 24, and carried by ring 29, is then engaged by abutments 39 on nut flange 38 and abutments 35 on shaft collar 34 in the manner previously indicated to stop rotation of the screw and shaft 10 positively and precisely in the desired limit position. Geared to the shaft, nut 14 is also stopped, along with the other rotative parts of the mechanism.

The described operation of the illustrative form of the stop mechanism has been based on the assumption that the nut is rotated slower than the screw so that the nut flange ribs 37 are gradually overtaken in rotative position by the ribs 33 on collar 32. That is the preferred case since the screw, hence shaft 10, is directly stopped by the balls, and the accuracy of the shaft stopping point is not impaired by backlash of gears, for example. Shaft 56 is, of course, also stopped, although through interposition of gears between it and shaft 10.

An alternative way of utilizing the nut's approach to its desired end limits of travel on screw 12 to stop shaft 10 is to arrange to stop rotation of nut 14 and not abutment collars 32 and 34, by direct ball engagement. This may be done in the apparatus illustrated by driving the nut slightly faster than the screw, and reversing the sense of the thread, if necessary, as previously described. In that case the ribs 37 would gradually overtake the nut flange ribs 33. Thus the roles played by the nut flange and shaft collar abutments deflecting and engaging the balls are merely interchanged. In this case the ribs 33 would displace and hold the balls outward in the direct path of and to be engaged by ribs 37, so that the nut's rotation will be stopped directly by the balls, but that of the shaft is, of course, stopped indirectly at precisely the same instant, neglecting any backlash which there may be in the gears interconnecting the nut and shaft.

Still other, although possibly less favorable alternative ways of achieving a reversal of the roles played by the nut flange and screw collar abutments in engaging the ball elements, so that either the screw or the nut is directly stopped by the balls, are readily attainable with mechanism of basically the same type as that illustrated. Theoretically, it is the rotative relationship of the three controlling elements, the nut abutments, the screw abutments, and the retained balls which determines whether it is the screw abutment or the nut abutment which leads the other such abutment by the correct angular amount at the instant they approach and cooperatively engage the ball. The abutment which leads at that instant displaces the ball engaged into the rotative path of the abutment which lags, thereby positively arresting further movement of the latter abutment by its lodging against the ball; this, irrespective of whether it is the screw or the nut which rotates the faster. With these considerations in mind it will be seen that a rotative shift by the correct amount, of any one of such three elements without shifting the others the same amounts or at all will result in effecting the reversal of roles as previously mentioned. Practically, however, it is considered preferable that the more rapidly rotated of the screw collar abutment or nut flange abutment be the one which is directly arrested by engagement with the ball. The reason for this preference is that in the reverse case where the slower abutment is the one which lodges circumferentially against a ball, it may be demonstrated that the rotative speeds of nut and screw must be more widely differentiated for given subtended angular widths of the abutments or ribs and the balls, and/or a given number of circumferentially spaced balls employed in the stop means. The speed differential in such a case would be permissively the least if only one small ball in each stop means were employed and if the subtended angular widths of the ribs or abutments were as small as possible.

The precise rotative stopping position of the shaft may be accomplished in the illustrative case by properly setting the rotative position of the housing 22 about the shaft. Sometimes it may be more convenient to set the position of the external shaft load in relation to the shaft.

In keeping with a main object of the invention, it being to provide a limit stop mechanism which is compact, it will be evident that the screw should be as short as possible and therefore that the screw pitch distance should be no greater than necessary. The design criteria governing pitch distance may first be considered. The screw pitch must be steep enough that the requisite overlap of nut flange and ball retainer occurs before locking engagement between the flange abutment and ball is effected, so that such abutment will not be forced prematurely into contact with a ball to hold it against deflection when contacted by a screw abutment, thus to produce structural overload of an edge or corner of the nut abutment or cause undesired wear concentration on it. Additionally, to obtain the greatest compactness the pitch of the screw should be only sufficiently steep to effect such requisite overlap of the nut flange and ball retainer.

For example, in the case illustrated in the drawings of two diametrically opposite balls constituting a set, it will be seen that the nut flange abutments approaching the end position must, if they are to deflect the balls properly into the immediate path of the shaft collar abutments to effect stopping thereof, advance along the screw from effectively zero overlap of the set of balls to full overlap in slightly less than the shaft rotation required, in the ideal case, to effect one-half a turn of the nut on the screw, moving differentially. The nut would thus travel along the screw from the first engagement of the nut flange abutments with the balls to stopping engagement in somewhat less than half a pitch distance of the screw.

If greater compactness were desired, a screw pitch only approximately half as steep could be used if a single rib on the nut flange, a single rib on the screw collar, and only one ball in each of the rings 28 and 29 were provided. Alternatively, if each set of balls was composed of more than two equally spaced balls, and ribs corresponding in number and spacing were formed on the nut flange and screw collar, a screw having an even steeper pitch than that shown in the illustrated mechanism would be required.

In the detailed construction of the stop mechanism, as in Figure 1, various expedients are utilized to minimize the weight and inertia of rotating parts of the mechanism. This is true particularly of the nut 14, which is of web and flange construction, of the retainer rings 28 and 29 which have thin web portions, of the gear 20 composed of a thin disk formed on a long-thin-walled hub, and of the idler gear 18 the teeth of which are formed on the tubular body 19 journaled for rotation, not by a solid shaft extending throughout its length but by means supporting it only at its ends. Although the teeth of gear 18 and gear section 18′ are aligned and might otherwise be continuous single teeth, further weight is saved by blanking the gear periphery between such gear and gear section in the area not actually required to be engaged by either of gears 16 or 20. Clearly, of course, gear section 18′ could be formed as a gear entirely separate from gear 18, although such gears would be rotatively interconnected.

Except when in a limiting end position locked to one or the other of the ball retainer sleeves 28 or 30 through the respective sets of balls 24 or 26, nut 14 is free to be rotated on screw 12 by gear 18. The teeth of this gear are coextensive in length with the nut's permissible travel along screw 12, so that the gear 16 on the nut continuously engages gear 18 and slides along it as the nut's position along screw 12 changes.

The upper end of housing 22 about shaft 10 is closed by a bearing retainer plate or collar 53 within which bearings 55 and 57 respectively engage shaft 10 and the hub of collar 32 splined to the shaft, affording upper rotational support for the shaft assembly. The lower end of shaft 10 passing through housing 22 is journaled therein by a radial bearing 61 retained in an aperture extending through the lower closure plate 48, as shown. The particular type of structure selected for journaling the shaft 10 in the housing is a matter of engineering design.

The hollow gear body 19 is rotatively supported at its upper end by a radial bearing 44 received internally of it. This bearing is carried by the enlarged end of a stub shaft or pin 40 extending through the upper wall of housing 22. To prevent the pin from dropping out of the housing bore in which it is received the pin is annularly grooved adjacent to the outside of the housing to carry a split lock ring 42 received in such groove. At its lower end gear body 19 has an annular flange 45 journaled rotatively within a radial ball-bearing 46 received in an end recess 23 in the bottom of housing 22. Such bearing is retained in this recess by a closure assembly including a detachable end plate 48 having an aperture aligned with recess 23, and an axially flanged retainer disk 50 held in place in such aperture by a split ring 52 engaged in an annular groove in the aperture wall. This aperture is large enough for insertion and removal through it of the bearing 46 and the gear 18 when desired.

The enlarged head of a stub shaft 56 projecting axially through a central aperture in disk 50 is received within and pinned or otherwise secured to the gear flange 45 for conjoint rotation of the stub shaft and the gear 18, 18′. The stub shaft 56 is preferably adapted to operate a rotational position indicator capable of indicating the degree of travel or position of nut 14 along screw 12, where desired. For that purpose the stub shaft is shown splined for connection to such an indicator.

Alternatively, in some situations it might be desired to use the stub shaft 56 as the drive shaft, instead of shaft 10, which is entirely possible since the two shafts rotate conjointly, being interconnected by gears 18′ and 20. In that event the upper stub shaft or pin 40 might be connected to rotate with the gear body 19, eliminating bearing 44, and extend beyond the upper end of the housing to the shaft load. In such a case the projecting end portions of shaft 10 could be entirely eliminated, leaving only the screw portion 12, since such shaft would not then be the drive shaft. Still further, it would be possible to have the shaft 56 as a drive shaft and the shaft 10 connected to the load, or vice-versa. These and other variations are not herein illustrated because the particular application of the stop mechanism constitutes no essential part of the present invention.

If the described stop mechanism is to be employed in aircraft to limit wing flap travel in either direction in the event the normal limit switches fail to turn off the flap actuating shaft's drive motor at the appropriate normal limit points, then it may be desirable to include a friction clutch in the system to prevent overloading such motor when the stop mechanism stops the shaft positively against rotation by motor torque.

The use of the stop mechanism in other types of installations will, of course, vary according to the circumstances, and will be entirely obvious to those skilled in the mechanical arts. The unit is readily manufactured in varying sizes and forms to meet different load and operating requirements, and its shaft rotational limit factor, e. g. number of shaft rotations permitted, may be readily determined in design of the unit by an appropriate selection of the gear ratio factor effecting differential rotation of the screw and nut, as aforementioned, along with the screw length factor, or number of pitch distances traversed by the nut.

I claim as my invention:

1. Stop mechanism comprising fixed support means, a shaft journaled therein, traversing means cooperating with said shaft and including an element movable lengthwise of said shaft progressively by rotation thereof, stop engaging means rotatable with said shaft and disposed in the line of movement of said traversing means, and stop means secured to said support, engageable by said stop engaging means cyclically during rotation of said shaft, and engageable by said traversing means element moved along said shaft to the location thereof, said stop means when engaged by both said element and said rotatable means arresting movement of said element and rotation of said shaft coincidentally.

2. Stop mechanism comprising fixed support means, a shaft journaled therein, traversing means cooperating with said shaft and including an element movable lengthwise of said shaft progressively by rotation thereof, stop engaging means rotatable with said shaft and disposed in the line of movement of said traversing means, and stop means secured to said support, engageable by said stop engaging means and by said traversing means element moved along said shaft and thereby arresting movement of said element and rotation of said shaft coincidentally.

3. Stop mechanism defined in claim 2, wherein the traversing means additionally comprises means operable to rotate the traversing element in the same direction as the shaft, and at a rate directly related to but differentiated from the rate of rotation of the shaft, the rotationally related traversing element and stop engaging means comprising cooperants coacting with the stop means to arrest movement of the traversing element, one of said cooperants engaging the stop means and conditioning it for anti-rotational engagement thereafter by the other of said cooperants.

4. Stop mechanism comprising fixed, spaced support means, a screw shaft extending between and journaled for rotation in said spaced support means, shaft gear means secured to said screw shaft, intermediate gear means meshed with said shaft gear means for conjoint rotation therewith, traversing gear-nut means threaded on the screw and meshed with said intermediate gear means for conjoint rotation therewith, to rotate said gear-nut differentially with relation to the screw and thereby effect traversal of said gear-nut means along said screw shaft in either direction between said spaced support means, separate stop means anchored to said spaced support means, respectively, in the path of traversing movement of said gear-nut means, separate abutment means mounted on said screw shaft adjacent, respectively, to said support means and adapted for engagement with the respective stop means periodically by rotation of said shaft, each of said stop means having an element guided for limited displacement therein effected by engagement of one shaft-mounted means with such element, said gear-nut means also having separate abutment means on opposite ends thereof respectively engageable by rotation of the gear-nut means, with said displaceable elements at the ends of its traversing movement, one of the shaft-mounted abutment means and corresponding gear-nut abutment means being operable to displace the corresponding displaceable element of such stop means into the path of rotative engagement of the other such abutment means, to stop rotation of such abutment means by traversing movement of said gear-nut into engagement with such stop means, coordinated with screw shaft rotation.

5. Stop mechanism defined in claim 4, wherein the shaft-mounted means comprises a sleeve having a peripheral abutment, the stop means comprises a ball and fixed ball retainer on one side of said sleeve, guiding such ball for radial displacement, in position for engagement by said abutment during rotation thereof, and the gear-nut rotatable means comprises a flange having a peripheral abutment thereon also engageable with said ball on the other side of said retainer, either of said abutments being capable of displacing the ball into the rotational path of the other.

6. In stop mechanism the combination of a screw, a nut threaded rotatably on said screw and having on one side thereof a flange having an internal peripheral abutment thereon, a radially-apertured ball retainer ring concentric with said nut and a ball in its aperture, receivable within said flange for tangential engagement with said abutment by rotation of the same, and an abutment on said shaft within said ring engageable with said ball, by rotation of said shaft.

7. In stop mechanism the combination of a screw, a nut threaded rotatably on said screw and having on one side thereof a flange having an internal peripheral abutment thereon, a radially-apertured ball retainer ring concentric with said nut and a ball in its aperture, receivable within said flange for tangential engagement with said abutment by rotation of the same, and a screw shaft-secured collar concentric with said nut flange and ring, received for rotation within said ring, said shaft-secured collar having an external peripheral abutment on said shaft within said ring engageable with said ball, by rotation of said shaft.

8. Stop mechanism comprising a screw mounted for rotation, separate abutment members stationed at the respective opposite ends of said screw and rotatable thereby, nut means threaded on said screw for traversing the length thereof in either direction by relative rotation therebetween, reversible rotative means interconnecting said screw and nut means for conjoint rotation at differential rates to effect traversal of said screw by said nut means in either direction, traveling abutment members carried by said nut means and movable therewith lengthwise of the screw in either direction, into respective positions adjacent said end-stationed rotary abutment members, respectively, and stop means fixedly mounted adjacent the screw ends, respectively, and including abutment-controlled shiftable stop elements coacting with the adjacent stationary and traveling abutments in the end positions of travel of said nut means, respectively, one such abutment engaging and thereby shifting an adjacent stop element into the rotative path of the other abutment and thereby stopping rotation of the latter, hence of the screw and nut means in either of the latter's end positions of travel, respectively.

ROY H. ANDERSON.

REFERENCES CITED

The following references are of record in the file of this patent:

UNITED STATES PATENTS

| Number | Name | Date |
|---|---|---|
| 613,748 | Wilson | Nov. 8, 1898 |
| 1,283,386 | Wenzelmann | Oct. 29, 1918 |
| 2,502,563 | Lee | Apr. 4, 1950 |

FOREIGN PATENTS

| Number | Country | Date |
|---|---|---|
| 987 | Great Britain | Apr. 19, 1859 |
| 363,423 | Germany | Nov. 8, 1922 |